(12) United States Patent
Yang et al.

(10) Patent No.: US 9,172,873 B2
(45) Date of Patent: Oct. 27, 2015

(54) CTIA IN-PIXEL CORRELATED DOUBLE SAMPLING WITH SNAPSHOT OPERATION FOR IR READOUT INTEGRATED CIRCUITS

(71) Applicants: Guang Yang, Annandale, NJ (US); Jonathan Bergey, Kennett Square, PA (US)

(72) Inventors: Guang Yang, Annandale, NJ (US); Jonathan Bergey, Kennett Square, PA (US)

(73) Assignee: Forza Silicon Corporation, Pasadena, CA (US)

( * ) Notice: Subject to any disclaimer, the term of this patent is extended or adjusted under 35 U.S.C. 154(b) by 194 days.

(21) Appl. No.: 13/907,225

(22) Filed: May 31, 2013

(65) Prior Publication Data

US 2014/0016027 A1 Jan. 16, 2014

Related U.S. Application Data

(60) Provisional application No. 61/654,592, filed on Jun. 1, 2012.

(51) Int. Cl.
*H04N 5/232* (2006.01)
*H04N 5/357* (2011.01)
*H04N 5/3745* (2011.01)
*H04N 5/378* (2011.01)

(52) U.S. Cl.
CPC ......... *H04N 5/23241* (2013.01); *H04N 5/3575* (2013.01); *H04N 5/378* (2013.01); *H04N 5/3745* (2013.01)

(58) Field of Classification Search
CPC ... H04N 5/23241; H04N 5/232; H04N 5/378; H04N 3/155; H04N 5/3575; H04N 5/3745; H03F 3/087
See application file for complete search history.

(56) References Cited

U.S. PATENT DOCUMENTS

| | | | | |
|---|---|---|---|---|
| 5,363,055 A * | 11/1994 | Ribner | | 330/9 |
| 5,614,740 A * | 3/1997 | Gardner et al. | | 257/222 |
| 5,892,540 A * | 4/1999 | Kozlowski et al. | | 348/300 |
| 6,678,048 B1 * | 1/2004 | Rienstra et al. | | 356/419 |
| 2014/0061472 A1 * | 3/2014 | Salvestrini et al. | | 250/339.02 |

* cited by examiner

*Primary Examiner* — Luong T Nguyen

(57) ABSTRACT

An image sensor array that has a buffer amplifier, having a capacitor which receives photogenerated energy from a photodetector, and stores the photo generated energy in a capacitor of the buffer amplifier. A reset across the buffer amplifier is applied at a time which is sufficient to allow the amplifier to settle transiently prior to applying the clamp voltage. There is also a source follower that is enabled to operate at a time just before snapshot operation, and then turned off when the snapshot is over, to save on power.

13 Claims, 4 Drawing Sheets

CTIA IN-PIXEL CORRELATED DOUBLE SAMPLING WITH SNAPSHOT OPERATION FOR IR READOUT INTEGRATED CIRCUITS

This application claims priority from Provisional application No. 61/654,592, filed Jun. 1, 2012, the entire contents of which are herewith incorporated by reference.

BACKGROUND

A typical capacitance transimpedance amplifier (CTIA)-based Infra-Red (IR) Read out Integrated Circuit (ROIC) pixel circuit 100 is shown in FIG. 1. The circuit 100 is connected to a photodetector, e.g. an infrared photodetector 99 as shown in FIG. 1. The circuit maintains a fixed reverse-bias on the IR Photodetector 99, while integrating the photocurrent from the photodetector 99.

A buffer amplifier 110 includes a feedback loop 106. The current from the infrared detector is integrated by the buffer amplifier. The feedback loop 106 includes a capacitor 105 that holds the current that has been integrated. The output 115 of the buffer amp is thus a voltage representative of the amount of current that has been integrated. This voltage is buffered by a source follower 120 that forms the pixel output.

An integration node is formed at the output of the buffer amplifier 110. In order to maintain consistency between pixels, the CTIA integration node voltage must be reset to a known value between integrations. This is done by shorting the input and output of the CTIA Opamp together using a controllable switch 125. During this reset phase, the Opamp then drives the output (integration node) to the same voltage that is on the positive input of the Opamp.

Typical imagers only reset one row of the pixel array at a time, even though the net integration time is the same for all the rows. This results in a time delta between start and end of integration from row-to-row. The end effect of this temporal delta is distortion of moving scenes. Certain applications need to maintain the image integrity of moving scenes.

A Snapshot or Frame Shutter operation operates to start and end integration at the same time for all the Pixels in the array.

Previous solutions have implemented a correlated double sampling operation from the downstream circuitry by performing two successive readouts from the Pixel.

SUMMARY

The inventors recognize that reset noise is generated by the uncertainty in the total amount of charge (kTC noise) across the reset switch 125. This noise is a function of the total input capacitance and feedback capacitance of the specific CTIA circuit. For a high-gain CTIA, this reset noise can be hundreds or more electrons, input-referred. Removal of this noise source is critical for low-noise imaging operation.

As the demand for higher resolution arrays and smaller pixel pitch increases, the need for a low-area, low-power solution for removing the CTIA reset noise and implementing a Snapshot operation becomes more important.

An embodiment implements In-Pixel correlated double sampling by AC-coupling the Pixel integration node to a second node that is clamped to a quiet reference level. This AC-coupling operation in the Pixel suppresses the uncertainty in the reset level of the CTIA Pixel. The Snapshot operation is implemented by another storage node in the Pixel with a readout to support both the In-Pixel correlated double sampling and Snapshot operations.

DETAILED DESCRIPTION

An embodiment describes an approach for implementing a Snapshot (Frame Shutter) operation as well as canceling the reset noise of a Charge Transimpedance Amplifier (CTIA) for Infrared Readout Integrated Circuits (IR ROIC).

Certain applications require capturing images of fast-moving scenes, without the distortion that can be generated by traditional rolling shutter operation mode imagers. The reset noise can be the dominant noise source in a CTIA type of readout circuit.

The inventors recognized that there can be significant overhead to implementing the correlated double sampling function downstream from the pixel. When conventional correlated double sampling is used, two successive reads are required, thus doubling the readout bandwidth requirements and impacting overall system power.

In addition, the leakage current of the transistor will cause errors by way of noise added to the two-frame readout correlated double sampling scheme.

Since the reset level and signal level are readout in two frames, the signal chain noise is added and is quadrupled. Thus, the image noise is even higher.

Figure 1:
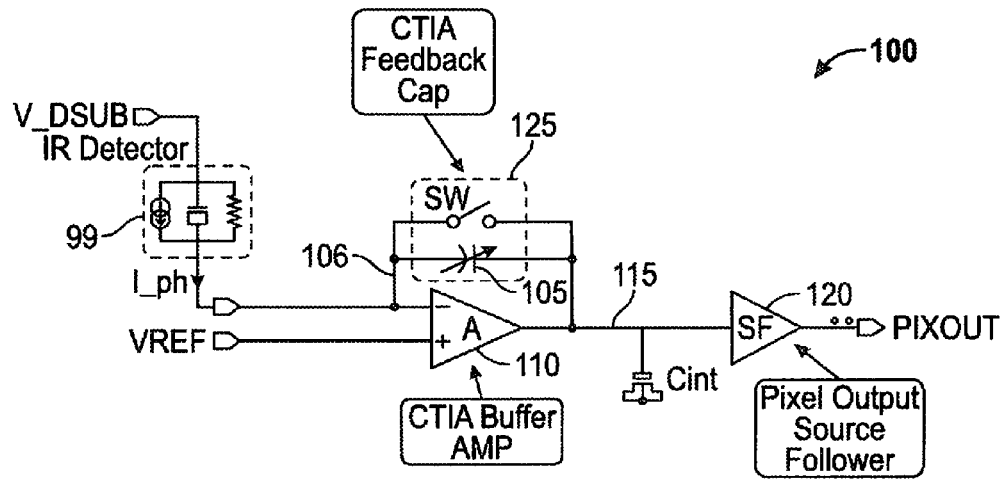
FIG. 1 shows a typical CTIA circuit.
Figure 2:
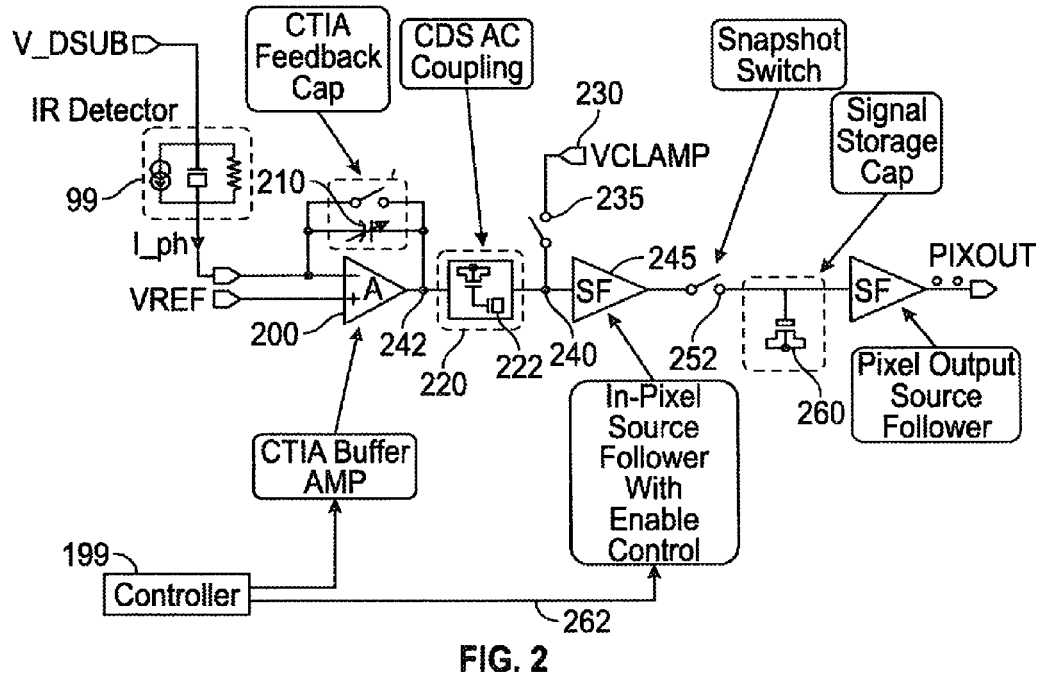
FIG. 2 shows an embodiment with in pixel correlated double sampling.

FIG. 2 shows an embodiment of a basic structure that implements the Snapshot CTIA In-Pixel correlated double sampling of an embodiment in a power saving way. The IR photodetector 99 receives current from photogenerated photons. The photodetector 99 is coupled to the input of buffer amp 200. Photogenerated current from the infrared photodetector 99 is integrated across the capacitor 210 in the feedback loop of the buffer amplifier 200. The output of the buffer amplifier shown as node 242, is AC coupled to a clamp level circuit.

In operation, the photogenerated current is integrated across the capacitor 210, and then reset between samples. Reset is carried out by closing the reset switch 244, thus shorting out the current stored in the capacitor 210. When the reset switch 244 is closed, the input of the buffer amp 200 is also connected directly to its output 242. Rather than using a downstream double sampling, in this embodiment, the correlated double sampling operation is achieved by using a clamp voltage 230. The clamp voltage 230 is switched by a clamp switch 235 onto the output line 240. The timing of the operation is carried out by releasing the correlated double sampling clamp switch 235 some period of time, e.g., 10-100 ns, after releasing the CTIA Reset switch 244. This is based on the inventor's recognition that carrying out the reset causes a disturbance in the operational amplifier being used as the buffer. The system allows enough time for the resulting reset disturbance to settle transiently before the integration voltage is permitted to AC-couple to the other side of the correlated double sampling capacitor 220.

Once the correlated double sampling Clamp switch 235 is released, the reset level is stored across the correlated double sampling capacitor 222. Then the correlated double sampling side of the capacitor 222 follows the normal integration of charge from the CTIA onto the integration node 242 and forms the resultant signal level for the Pixel as the difference between the amount of charge at node 242 and the clamping value that was previously placed on node 240 and was stored across the capacitor 222. That signal forms the output signal which is amplified by the source follower 245.

The output signal is a linear function of the settled Reset value and the Integrated Signal level, thus cancelling the Reset noise. Since the reset value is allowed to settle across the capacitor 222, any noise in that reset signal is effectively averaged out. Therefore, the averaged reset value is essentially used by every pixel, removing any noise that may exist on those reset values.

To support the readout of the Snapshot CTIA Pixel, source-follower 245 is used to buffer the correlated double sampling AC-coupling capacitor to the Snapshot storage node. The source follower 245 is driven by an enable signal 262 that turns on the source follower 245, and when the enable signal 262 is not active, the source follower is off.

This source-follower 245 is coupled by a switch 252 to a storage capacitor 260. The source follower 245 is turned on some period of time before the snapshot switch 252 is closed, by enough of the period of time to allow a source follower to activate and settle.

Since this source-follower buffer is only needed during Snapshot operation, dynamically pulsing this enable 262 can lower the total ROIC power. Once the Snapshot switch 252 is opened, a signal proportional to the total integrated charge is stored on the Snapshot storage capacitor 260. Some short period of time after the Snapshot switch is opened, the source-follower 245 that buffers the AC-Coupling capacitor node can then be disabled.

The above has described the operation of one single pixel, however it should be understood that this can be used as part of an array of pixels, for example this can be used in a column parallel pixel arrangement.

Figure 3:
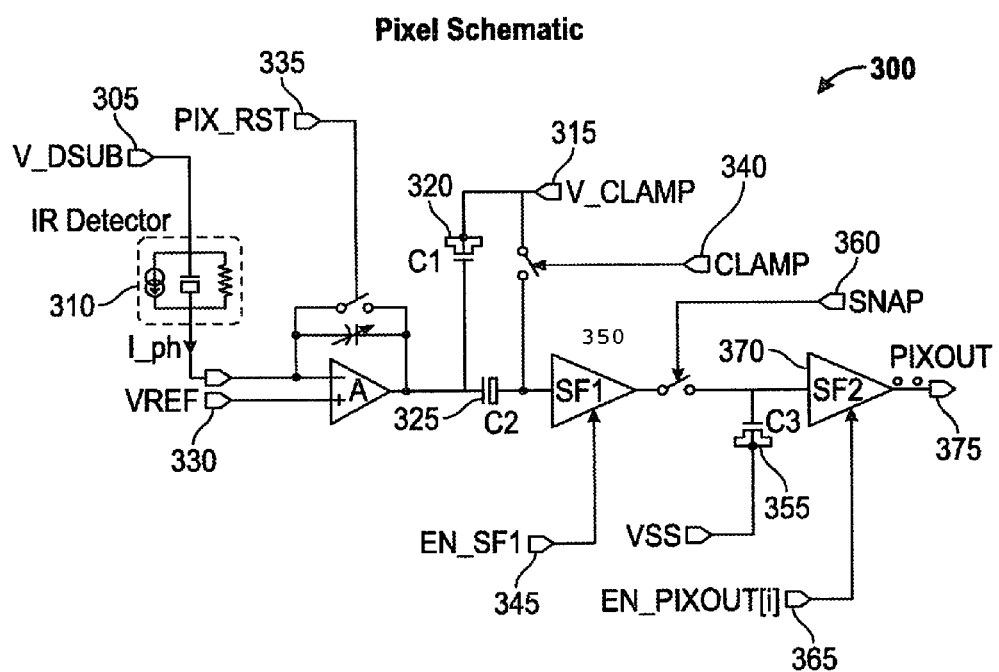
FIG. 3 shows a pixel schematic with signals.

FIG. 3 depicts a detailed pixel schematic showing the different signals and controls including further detail. This pixel has three (3) bias voltages:

V_DSUB 305 is the IR sensor 310 bias voltage. This bias voltage is not on the silicon ROIC. It is the bias voltage on the IR sensor side.

V_CLAMP 315 is the clamp voltage for the AC coupled capacitors (C1 320 and C2 325) to sample the correlated double sampling signal from the IR sensor; and VREF 330 is the reference voltage of the CTIA buffer AMP that sets the virtual ground of the IR sensor.

The pixel has five (5) control signals:

PIX_RST 335 resets the pixel input capacitor to start integration.

CLAMP 340 clamps the pixel reset level to AC coupled capacitors (C1 320 and C2 325);

EN_SF1 345 enables the source follower 350 (SF1) that amplifiers the correlated double sampling signal on AC coupled to the storage capacitor (C3);

SNAP 360 controls sampling the signal to storage capacitor (C3) for late reading out in a row-by-row based operation; and Finally, EN_PIXOUT[i] 365 enables the pixel output source follower (SF2) for reading out the signal from pixel in a row-by-row based operation.

This pixel has one output, which is PIXOUT 375. This output signal is the signal at the storage node amplified by the pixel output source follower.

Figure 4:
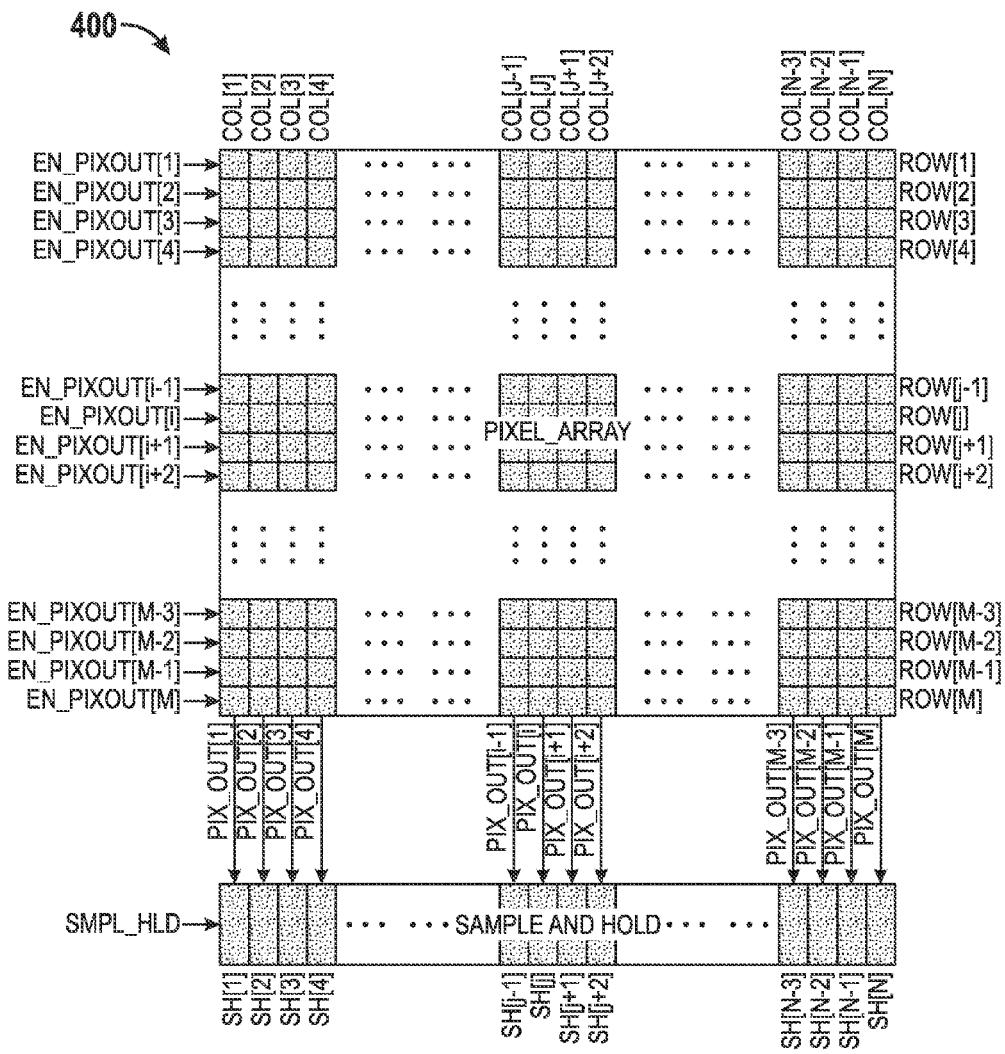
FIG. 4 shows the pixel array configuration with sample/hold (SAMPLE & HOLD) block.

FIG. 4 shows the pixel array configuration with sample/hold (SAMPLE & HOLD) block. A pixel array 400 has N columns (from col[1] to col[N]) and M rows (from row[1] to row[M]) of pixels. The pixel output (PIX_OUT in FIG. 3) of each column is connected together. Thus, the pixel array has N output lines, from PIX_OUT[1] to PIX_OUT[N].

The IR ROIC is operating in snapshot mode. All the control signals to the pixel except the EN_PIXOUT[j] are global signals to the entire pixel array. FIG. 4 only shows the row based control signals EN_PIXOUT[1] to EN_PIXOUT[N].

The pixel array outputs (PIX_OUT[1] to PIX_OUT[N]) are connected to the input of the sample/hold (SAMPLE & HOLD) block. The sample/hold block contains N sample and hold cells, from SH[1] to SH[N]. Control signal to sample/hold block, SMPL_HLD, samples one row of signal from pixel array, waits for the downstream analog signal chain process (A-to-D conversion and readout from sensor).

Figure 5:
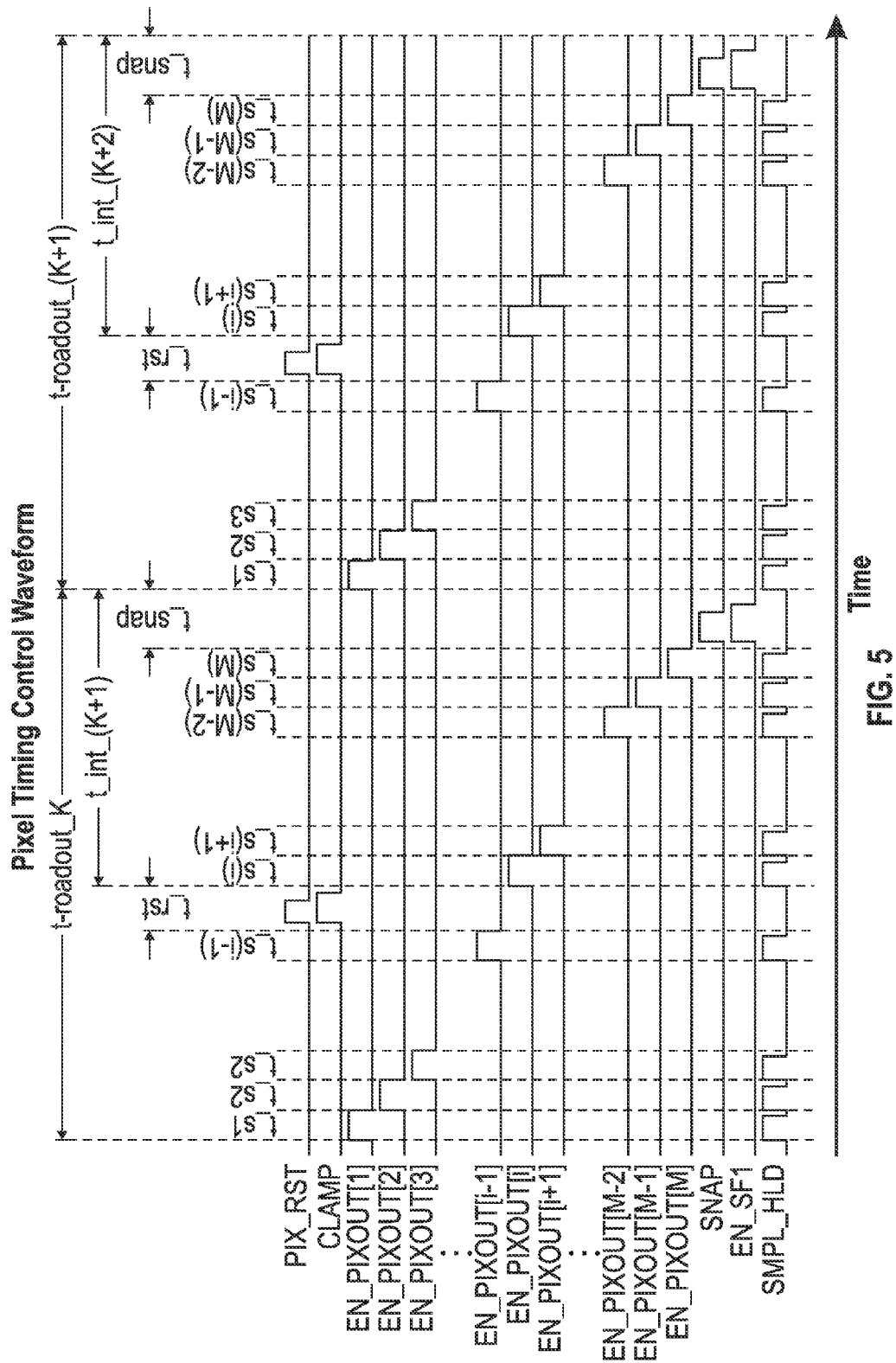
FIG. 5 shows the control waveform of pixel operation.

FIG. 5 shows the control waveform of pixel operation. The pixel integration and pixel readout are operating in parallel. In FIG. 5, t_s1, t_s2, ts3, . . . , t_s(i−1), t_s(i), t_s(i+1), . . . , t_s(M−2), t_s(M−1), and t_s(M) are sampling time of signals from row[1], row[2], row[3], . . . , row[i−1], row[i], row[i+1], . . . , row[M−2], row[M−1], and row[M], respectively; t_rst is the time interval to reset the pixel that starts the pixel integration. t-rst can start between any row sampling time;

t_snap is the time interval of snapshot the integrated signal (from the source follower 1 output) to the storage capacitor (C3) for next frame readout;

t_readout_K is the time in reading out frame K of the image;

t_readout_(K+1) is the time in reading out frame (K+1) of the image;

t_int_(K+1) is the integration time of frame (K+1); and t_int_(K+2) is the integration time of frame (K+2).

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of circuits can be controlled in this way. While the above describes the photoreceptors being infrared detectors, other kinds of photo receptors can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form. This may include laptop or desktop computers, and may also include portable computers, including cell phones, tablets such as the IPAD™, and all other kinds of computers and computing platforms.

A processor may can be used to control the operation, or alternatively the operation can be controlled by a controller. The processor may be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An image sensor device, comprising:
   a buffer amplifier, having a capacitor which receives photogenerated energy from a photodetector, and stores the photo generated energy in the capacitor of the buffer amplifier, said buffer amplifier having an output, and having a reset switch that is connected across said capacitor to reset a voltage on said capacitor;
   a clamp voltage which is selectively connected to the output of said buffer amplifier by a clamp switch; and
   an AC coupled correlated double sampling capacitor, which is selectively connected between said output of said buffer amplifier and said clamp voltage, and
   a controller, which controls a connection of said reset switch, said clamp voltage, and said AC coupled correlated double sampling capacitor, controlling said clamp switch to be released at a time after releasing a reset across said buffer amplifier which is sufficient to allow the buffer amplifier to settle transiently prior to applying said clamp voltage;

a source follower amplifier between said AC coupled correlated double sampling capacitor and an output of said image sensor device; and said controller controlling the source follower amplifier by activating an enable signal to turn on the source follower amplifier at a time before an output of said image sensor device is to be produced, and to turn off the source follower amplifier at a time after the output of said image sensor is to be produced.

2. The image sensor device as in claim 1, wherein said clamp voltage is applied between 10 and 100 ns after releasing the reset switch.

3. The image sensor device as in claim 1, further comprising a snapshot switch, which is enabled to sample information from the image sensor device, and where the source follower amplifier is activated by the enable signal a time before activating the snapshot switch.

4. The image sensor device as in claim 3, wherein said source follower amplifier is turned off at a time after the snapshot switch is no longer enabled.

5. The image sensor device as in claim 1, wherein said clamp voltage is allowed to settle across said capacitor.

6. A method of obtaining information in an image sensor, comprising:

receiving photogenerated energy from a photodetector into a capacitor and storing the photogenerated energy in the capacitor;

resetting the capacitor;

applying a clamp voltage as a reset voltage to said capacitor; and controlling said clamp voltage to be released at a time after releasing the resetting which is sufficient to allow the resetting to settle transiently prior to applying said clamp voltage;

producing an output of the photodetector using a source follower amplifier between said capacitor and the output of said image sensor; and controlling the source follower amplifier by activating an enable signal to turn on the source follower amplifier at a time before an output of the image sensor is to be produced, and to turn off the source follower amplifier at a time after the output of the image sensor is to be produced.

7. The method as in claim 6, wherein said clamp voltage is applied between 10 and 100 ns after releasing the resetting.

8. The method as in claim 6, further comprising a snapshot switch, which is enabled to sample information and where the source follower amplifier is activated by the enable signal a time before enabling the snapshot switch.

9. The method as in claim 8, wherein said source follower amplifier is turned off at a time after the snapshot switch is no longer enabled.

10. The method as in claim 6, wherein said clamp voltage is allowed to settle across said capacitor.

11. An image sensor device, comprising:

a buffer amplifier, having a capacitor which receives photogenerated energy from a photodetector, and stores the photogenerated energy in the capacitor of the buffer amplifier, said buffer amplifier having an output, and having a reset switch that is connected across said capacitor to reset a voltage on said capacitor;

a clamp voltage which is selectively connected to the output of said buffer amplifier;

a double sampling capacitor;

a snapshot switch, which is activated to sample image information;

a source follower amplifier which is turned on by activating an enable signal at a time before the snapshot switch is activated to sample the image information from the image sensor device, and before an output of the image sensor device is to be produced and turned off when said enable signal is no longer active, at a time after the snapshot switch is no longer active, so that said source follower amplifier is turned off when the snaphot switch is not closed.

12. The image sensor device as in claim 11, further comprising a controller, which controls said selected connection of said reset switch, said clamp voltage, and said double sampling capacitor, controlling a clamp switch that selectively connects said clamp voltage to be released at a time after releasing a reset across said buffer amplifier which is sufficient to allow the buffer amplifier to settle transiently prior to applying said clamp voltage.

13. The image sensor device as in claim 11, wherein said clamp voltage is allowed to settle across said capacitor.

* * * * *